United States Patent
Keong

(10) Patent No.: US 9,819,000 B2
(45) Date of Patent: Nov. 14, 2017

(54) BATTERY MODULE POSITIONING STRUCTURE AND BATTERY MODULE

(71) Applicant: Tymphany Worldwide Enterprises Limited, Grand Cayman (KY)

(72) Inventor: Hong Gee Keong, Sungai Petani (MY)

(73) Assignee: TYMPHANY WORLDWIDE ENTERPRISES LIMITED, Grand Cayman (KY)

(*) Notice: Subject to any disclaimer, the term of this patent is extended or adjusted under 35 U.S.C. 154(b) by 0 days.

(21) Appl. No.: 14/549,608

(22) Filed: Nov. 21, 2014

(65) Prior Publication Data

US 2016/0149173 A1    May 26, 2016

(51) Int. Cl.

| | | |
|---|---|---|
| *H01M 10/04* | (2006.01) | |
| *H01M 2/18* | (2006.01) | |
| *H01M 10/42* | (2006.01) | |
| H01M 4/70 | (2006.01) | |
| H01M 4/02 | (2006.01) | |

(52) U.S. Cl.
CPC .......... *H01M 2/18* (2013.01); *H01M 10/049* (2013.01); *H01M 10/425* (2013.01); *H01M 4/70* (2013.01); *H01M 10/0436* (2013.01); *H01M 2004/025* (2013.01); *H01M 2220/30* (2013.01)

(58) Field of Classification Search
CPC ..... H01M 2/204; H01M 2/026; H01M 2/0262
See application file for complete search history.

(56) References Cited

U.S. PATENT DOCUMENTS

| | | | | |
|---|---|---|---|---|
| 2006/0026822 A1* | 2/2006 | Seman | ................. | H01M 2/204 29/623.4 |
| 2010/0124693 A1* | 5/2010 | Kosugi | ............. | G01R 31/3644 429/92 |
| 2010/0203381 A1* | 8/2010 | Kim | ...................... | H01M 2/021 429/179 |
| 2012/0237817 A1* | 9/2012 | Kim | ....................... | H01M 2/26 429/158 |

* cited by examiner

*Primary Examiner* — Olatunji Godo
(74) *Attorney, Agent, or Firm* — Cantor Colburn LLP

(57) ABSTRACT

A battery module positioning structure and a battery module are provided. The battery module positioning structure includes a substrate and a first electrode plate. The substrate includes a first through hole and a third through hole formed therein. The first through hole and the third through hole have a first clearance therebetween, and the substrate has a first surface and a second surface. The first electrode plate is secured onto the substrate. The first electrode plate includes a first terminal, a first body and a third terminal. The first terminal is connected to one end of the first body, and another end of the first body is connected to the third terminal. The first terminal is disposed on the first surface, and the first body is disposed on the second surface. The electrode plate can be easily engaged onto the substrate by way of the plurality of through holes, thereby readily assembling the battery module.

9 Claims, 4 Drawing Sheets

BATTERY MODULE POSITIONING STRUCTURE AND BATTERY MODULE

FIELD OF THE INVENTION

The present invention relates to technical fields of battery module positioning structure and battery module, and more particularly to a battery module positioning structure for readily positioning and assembling an electrode, and a battery module.

BACKGROUND OF THE INVENTION

With the popularization of portable electronic devices, how to effectively extend the available time of a portable electronic device becomes one of the key considerations. Conventionally, in addition to increasing battery capacity, the use of a mobile power pack for supplying power is also a solution for extending available time of a portable electronic device.

A mobile power pack mainly includes a housing, an electric connector, a battery cell, and electrodes. The electric connector is used for connecting to a portable electronic device, and for example, can be a USB (Universal Serial Bus) connector. The battery cell is connected to the electric connector via the electrodes.

For securing the electrodes onto the battery cell, a trench is formed on the housing for accommodating and thus securing the electrodes, thereby connecting the electrodes to the battery cell. However, the mounting of the electrodes in the trench is complicated, and might result in poor conduction due to possible aligning deviation between the electrodes and the trench.

In view of the foregoing, a battery module positioning structure and a battery module are proposed to solve the drawbacks of prior art.

SUMMARY OF THE INVENTION

The invention provides a battery module positioning structure, which includes a substrate and an electrode plate, wherein a plurality of through holes are formed in the substrate for clamping and securing the electrode.

The invention further provides the battery module positioning structure as mentioned above, wherein the electrode can be readily detached from the through holes for quick replacement.

The invention further provides the battery module positioning structure as mentioned above, which is extensively adapted for a plurality of the electrode plates, wherein the electrode plates ameliorate the poor conduction of the electrode plate and exhibit high electrical conductivity.

The invention further provides the battery module positioning structure as mentioned above, wherein the substrate exhibits flexible and highly insulating features and can be curled and bent conforming to the exterior shape of a battery cell, thereby enclosing the battery cell for electric isolation from the external.

The invention further provides a battery module, which includes a battery cell, a battery module positioning structure, and a printed circuit unit. Via the battery module positioning structure, power is charged to the battery cell through the printed circuit unit, and power stored in the battery cell is discharged through the printed circuit unit.

More specifically, the present invention provides a battery module positioning structure, which includes a substrate and a first electrode plate. The substrate is formed thereon a first through hole and a third through hole. The first through hole and the third through hole have a first clearance therebetween, and the substrate has a first surface and a second surface. The first electrode plate is secured onto the substrate. The first electrode plate includes a first terminal, a first body and a third terminal. The first terminal is connected to one end of the first body, and another end of the first body is connected to the third terminal. The first terminal is disposed on the first surface, and the first body is disposed on the second surface.

The present invention further provides a battery module, which includes a battery cell, a substrate, a plurality of electrode plates and a printed circuit unit. The battery cell is formed with a first electric end and a second electric end for storing and releasing charges, wherein the first electric end and the second electric end are capable of receiving and releasing charges of contrary polarities. The substrate encloses the battery cell. The substrate is formed therein a first through hole and a third through hole. The first through hole and the third through hole have a first clearance therebetween, and the substrate has a first surface and a second surface in contact with the battery cell. A plurality of electrode plates are secured onto the substrate. Each of the electrode plates includes a first terminal, a body and a third terminal, wherein the first terminal is connected to one end of the body, another end of the body is connected to the third terminal, and the electrode plates have a second clearance between adjacent ones. A printed circuit unit has a first connecting point and a second connecting point. The first connecting point is connected to the first electric end, and the second connecting point is connected to the first electric end of each of the electrode plates. The third terminal is connect to the second electric end so that charges from the second electric end are guided to the first terminal via the third terminal and the body.

Compared to prior art, the battery module positioning structure provided according to the present invention can readily have the electrode positioned on the exterior of the battery cell, and the battery module can be produced by readily assembling the electrode and the battery cell.

BRIEF DESCRIPTIONS OF DRAWINGS

DETAILED DESCRIPTIONS OF PREFERRED EMBODIMENTS

For better understanding the features and effects of the present invention, the present invention will be described as follows by way of practical embodiments together with accompanying drawings.

Figure 1:
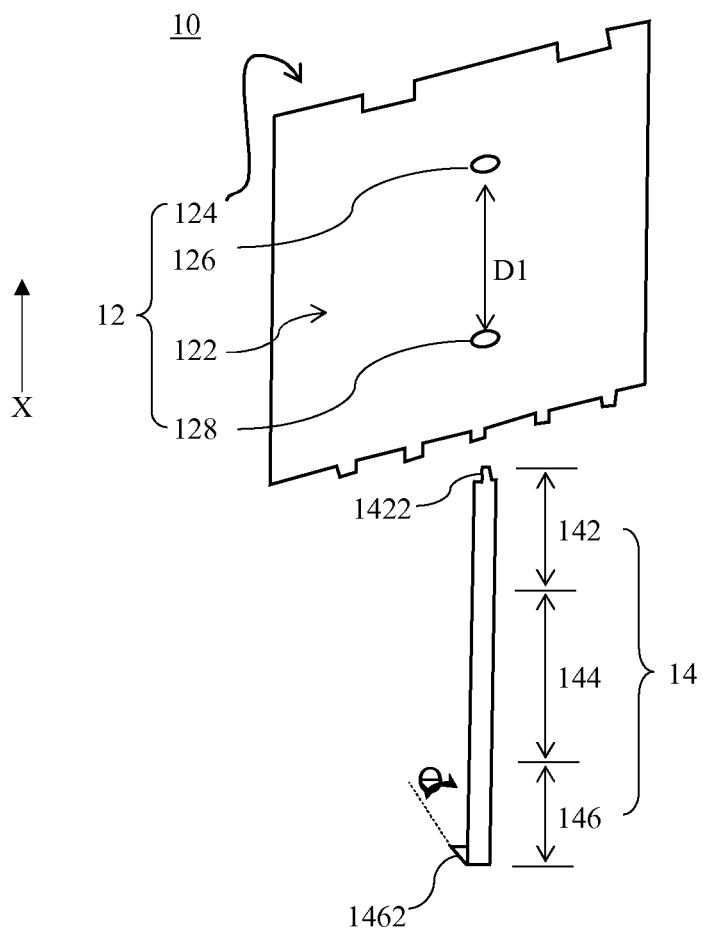
FIG. 1 is a schematic diagram illustrating a battery module positioning structure according to a first embodiment of the present invention.

Please refer to FIG. 1, which is a schematic diagram illustrating a battery module positioning structure according to a first embodiment of the present invention. In FIG. 1, the battery module positioning structure 10 includes a substrate 12 and a first electrode plate 14.

The substrate 12 exhibits flexible and insulating features for effects of electric isolation, curling and bending. For example, the material of the substrate can be Mylar or Kapton, or an equivalent material which possess similar characteristics. In this embodiment, the substrate 12 is a rectangular sheet having a first surface 122 and a second surface 124. However, in an alternate embodiment, the substrate 12 may include any desired shape such as, for example, square, curvilinear, rectilinear or a shape with a combination of curvilinear and rectilinear features.

The substrate 12 includes therein a first through hole 126 and a third through hole 128 disposed along an X axis. In this embodiment, the first through hole 126 and the third through hole 128 are exemplified as circular through holes. However, in alternate embodiments, the through holes 126, 128 may be oval, square, rectangle, or any desired curvilinear or rectilinear shape or shape having both curvilinear and rectilinear features. Furthermore, the first through hole 126 and the third through hole 128 have a first clearance D1 therebetween.

The first electrode plate 14 exhibits an electrically conducting feature, and enables charges to move on the surface thereof so as to form a charging current (not shown) or a discharging current (not shown). The first electrode plate 14 includes a first terminal 142, a first body 144 and a third terminal 146. The first terminal 142, first body 144 and third terminal 146 are integrally formed or formed as separate sections. In this embodiment, an integral formation is given as an example. The first terminal 142 is connected to one end of the first body 144, and another end of the first body 144 is connected to the third terminal 146.

At an end of the first terminal 142 not connecting to the first body 144, a first protruding member 1422 is formed. Meanwhile, at an end of the third terminal 146 not connecting to the first body 144, a third protruding member 1462 is formed. It is to be noted that in this embodiment, an angle $\theta$ exists between the third protruding member 1462 and the third terminal 146. In this embodiment, the angle $\theta$ is 90 degrees. That is, the third protruding member 1462 is perpendicular to the third terminal 146.

The first electrode plate 14 is an elongated rectangular member having a width equal to the diameters of the first through hole 126 and the third through hole 128. The length of the plate 14 is greater than the length of the substrate 12. By properly selecting the length, the plate 14 may have at least one of the first protruding member 1422 and the third protruding member 1462 extend beyond an edge of the substrate 12. In alternative embodiments, the width of the plate 14 can be smaller than the diameters of the first through hole 126 and the third through hole 128.

Figure 2:
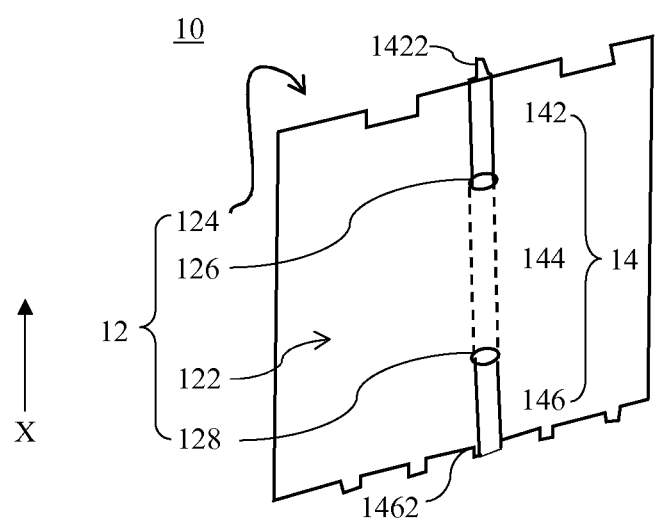
FIG. 2 is a schematic diagram illustrating the assembly of a substrate and a first electrode plate as shown in FIG. 1.

Refer to FIG. 2, which is a schematic diagram illustrating the assembly of a substrate and a first electrode plate as shown in FIG. 1. The assembly of FIG. 2 is obtained by inserting the first terminal 142 of the first electrode plate 14 into the third through hole 128 from the first surface 122 of the substrate 12. Then the first terminal 142 is inserted into the first through hole 126 from the second surface 124. The first terminal 142 thus returns back to the first surface 122. The operation ends when the first protruding member 1422 of the first terminal 142 protrudes from the edge of the substrate 12 while the first terminal 142 is disposed upon the first surface 122. Meanwhile, as for the relative positions of the first body 144 and the third terminal 146, the first body 144 is disposed on the second surface 124 while the third terminal 146 is disposed on the first surface 122. That is, the first body is disposed proximate to and/or in contact with the second surface 124 of the substrate 12 while the third terminal 146 is disposed proximate to and/or in contact with the first surface 122 of the substrate 12. Of course, this orientation is merely exemplary and can be reversed such that the first body 144 is disposed upon the first surface 122 and the third terminal is disposed upon the second surface 124.

Since the first electrode plate 14 is disposed on both the first surface 122 and the second surface 124, the first electrode plate 14 can be positioned and clamped onto the substrate 12 by the interactive forces exerted onto the two surfaces 122 and 124 of the substrate 12.

Figure 3:
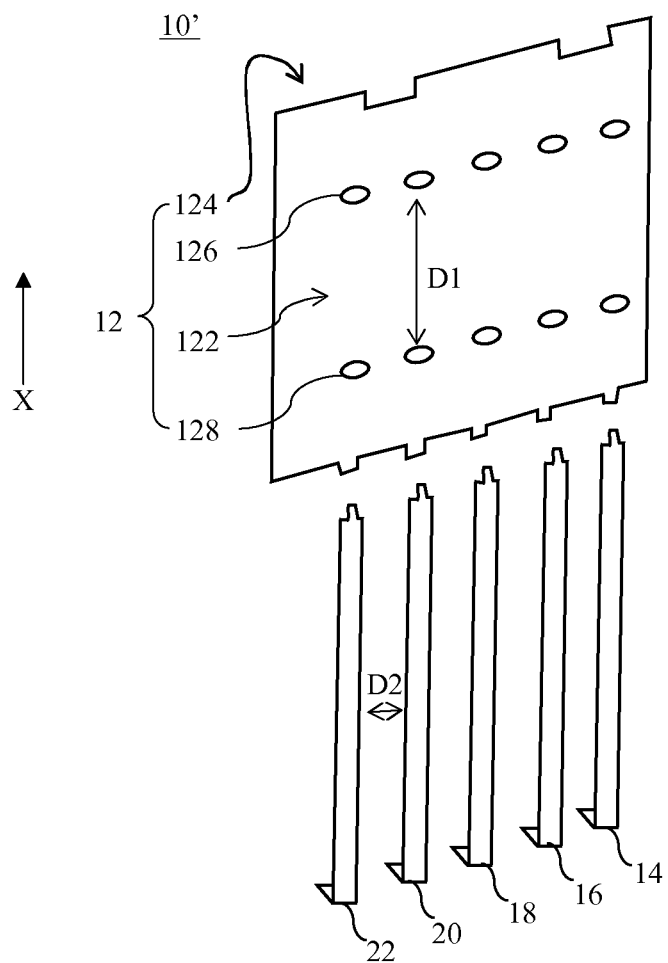
FIG. 3 is a schematic diagram illustrating a battery module positioning structure according to a second embodiment of the present invention.

Please refer to FIG. 3, which is a schematic diagram illustrating a battery module positioning structure according to a second embodiment of the present invention. Like elements of the various embodiments are indicated herein and throughout by consistent reference numerals. In FIG. 3, the battery module positioning structure 10' includes a second electrode plate 16, a third electrode plate 18, a fourth electrode plate 20 and a fifth electrode plate 22 in addition to the substrate 12 and the first electrode plate 14 as shown in FIG. 1.

The substrate 12 includes therein a plurality of first through holes 126 and a plurality of third through holes 128 along the X axis.

The assembling method of the first electrode plate onto the substrate 12 in the first embodiment can be applied to the electrode plates 16-22. Accordingly, the electrode plates 16-22 can be assembled to the substrate 12, like the first electrode plate 14. It is to be noted that in this embodiment, the electrode plates 14-22 are allocated with an even second clearance D2 between neighboring ones. However, in alternate embodiments, the clearance D2 need not be even. That is, as desired, the clearances between the electrode plates 14-22 may vary such that some of the plates 14-22 are closer together than others.

In the illustrated embodiment, the electrode plates 14-22 are used in a battery cell (not shown). Compared with the embodiment using a single electrode plate, the electrode plates 14-22 are advantageous in, for example, increasing quantity of flowing charges, dispersing the charge flow on condition of a single current flow so as to reduce heat accumulation, and avoiding the risk of disabled charge conduction once the single electrode plate malfunctions. By evenly distributing the electrode plates 14-22, the probability of local damages caused by collisions of the electrode plates 14-22 can be reduced, and furthermore, heat can be evenly dispersed.

It is to be noted that in this embodiment, the number of the electrode plates 14-22 is five, but in alternative embodiments, the number of the electrode plates can be less or more than five.

Figure 4:
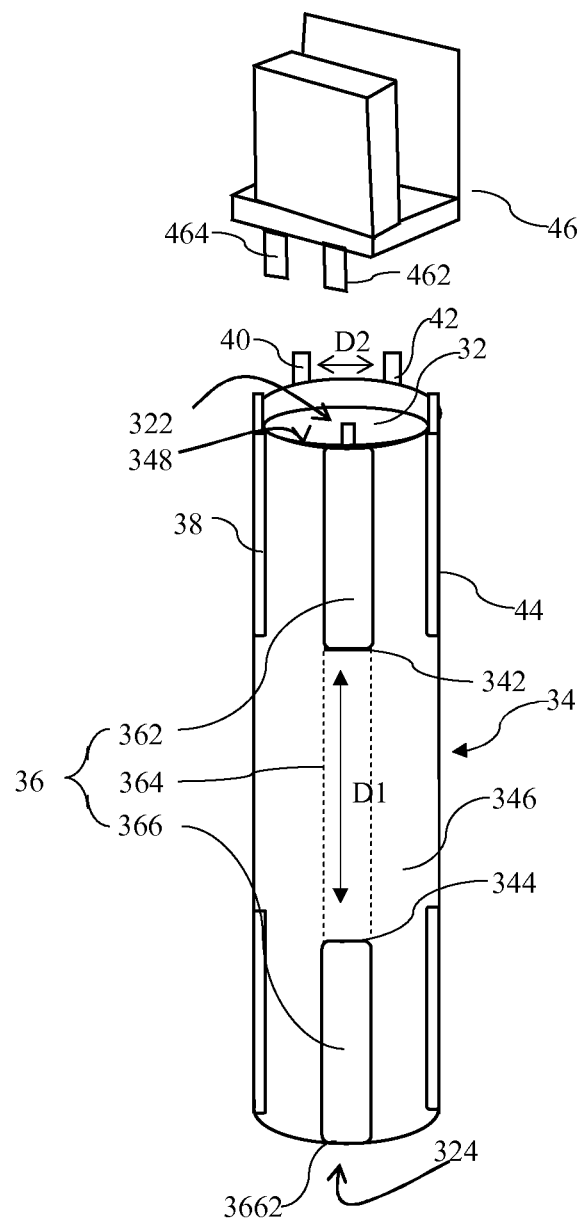
FIG. 4 is a schematic diagram illustrating a structure of a battery module according to an embodiment of the present invention.

Please refer to FIG. 4, which is a schematic diagram illustrating a structure of a battery module according to an embodiment of the present invention. In FIG. 4, the battery module 30 includes a battery cell 32, a substrate 34, a first electrode plate 36, a second electrode plate 38, a third electrode plate 40, a fourth electrode plate 42, a fifth electrode plate 44, and a printed circuit unit 46.

The battery cell 32 has charge-storing and charge-releasing features. For example, the battery cell can be a primary cell or a secondary cell. The battery cell 32 is formed with a first electric end 322 and a second electric end 324. The first electric end 322 and the second electric end 324 are capable of receiving and releasing charges of contrary polarities.

The features of the substrate 34 have been described in the first embodiment with respect to the substrate 12. The substrate 34 encloses the battery cell 32. The substrate 34 includes therein a first through hole 342 and a third through hole 344, wherein the first through hole 342 and the third through hole 344 have a first clearance D1 therebetween. Furthermore, the substrate 34 has a first surface 346 and a second surface 348.

In this embodiment, the battery cell 32 contacts with the second surface 348. Since the substrate 34 exhibits an insulating feature in addition to a flexible feature, charges in the battery cell 32 can be blocked from leaking outside through the substrate 34. Above all, when the battery module 30 is enclosed in a housing (not shown), the risk of electric shock of a user who touches the housing can be avoided.

The electrode plates 36-44 are secured onto the substrate 34. Take the first electrode plate 36 as an example. The first electrode plate 36 includes a first terminal 362, a body 364 and a third terminal 366. The first terminal 362 is connected to one end of the body 364, and another end of the body 364 is connected to the third terminal 366. Likewise, similar configuration is applicable to the other electrode plates 38-44. Furthermore, the electrode plates 36-44 have a second clearance D2 between adjacent ones.

The printed circuit unit 46 has a first connecting point 462 and a second connecting point 464, which are principally used for outputting charges or receiving external charges. The first connecting point 462 is connected to the first electric end 322, and the second connecting point 464 is connected to, for example, all the first terminals of the electrode plates 38-44.

Descriptions are given with the first electrode plate 36 as an example. The third terminal 366 is L-shaped. A third protruding member 3662 of the third terminal 366 is in contact with so as to connect to the second electric end 324, and charges from the second electric end 324 can be guided to the first terminal 362 via the third terminal 366 and the body 364.

The present invention has been disclosed with preferred embodiments as above. Those who are skilled in the art, however, should understand that the embodiments are merely given for illustrating the present invention, but should not be interpreted as limiting the scope of the invention. It is to be noted that all the equivalent changes or replacements are covered by the invention. Therefore, the scope of the invention should be defined based on the claims.

What is claimed is:

1. A battery cell positioning structure, comprising:
a substrate including a first through hole and a third through hole formed therein, the first and third through holes having a first clearance therebetween, the substrate further including a first surface and a second surface; and
a first electrode plate secured onto the substrate, and having a first terminal, a first body and a third terminal, wherein the first terminal is connected to one end of the first body, and another end of the first body is connected to the third terminal;
wherein the first and third through holes extend through the substrate from the first side to the second side; and
wherein the first electrode plate extends through at least one of the first and third through holes such that first terminal is disposed on the first surface, and the first body is disposed on the second surface.

2. The battery cell positioning structure according to claim 1, wherein the third terminal is disposed on the first surface.

3. The battery cell positioning structure according to claim 1, wherein the substrate is made of a flexible and insulating material for electric isolation, curling and bending.

4. The battery cell positioning structure according to claim 1, wherein diameters of the first through hole and the third through hole are no less than a width of the electrode plate.

5. The battery cell positioning structure according to claim 1, wherein a length of the electrode plate is no less than a length or width of the substrate.

6. The battery cell positioning structure according to claim 1, wherein a first protruding member of the first terminal and a third protruding member of the third terminal of the electrode plate extend beyond corresponding edges of the substrate.

7. The battery cell positioning structure according to claim 6, wherein an angle is formed between the third protruding member and the third terminal.

8. The battery cell positioning structure according to claim 1, further comprising a second electrode plate, wherein the second electrode plate is secured onto the substrate, and the second electrode plate and the first electrode plate have a second clearance therebetween.

9. A battery module, comprising:
a battery cell formed with a first electric end and a second electric end for storing and releasing charges, wherein the first electric end and the second electric end are capable of receiving and releasing charges of contrary polarities;
a substrate extending around a longitudinal axis of the battery cell so as to enclose the battery cell on at least four sides and including a first through hole and a third through hole formed therein, wherein the first through hole and the third through hole have a first clearance therebetween, and the substrate has a first surface and a second surface, the second surface being in contact with the battery cell;
a plurality of electrode plates secured onto the substrate, each of which includes a first terminal, a body and a third terminal, wherein the first terminal is connected to one end of the body, another end of the body is connected to the third terminal, and the electrode plates have a second clearance between adjacent plates; and
a printed circuit unit having a first connecting point and a second connecting point, wherein the first connecting point is connected to the first electric end, and the second connecting point is connected to the first terminal of each of the electrode plates;
wherein the third terminal is connected to the second electric end so that charges from the second electric end are guided to the first terminal via the third terminal and the body.

* * * * *